Oct. 5, 1926.
W. H. MOYSE
1,601,807
VEHICLE BUMPER
Filed Feb. 27, 1925   2 Sheets-Sheet 1
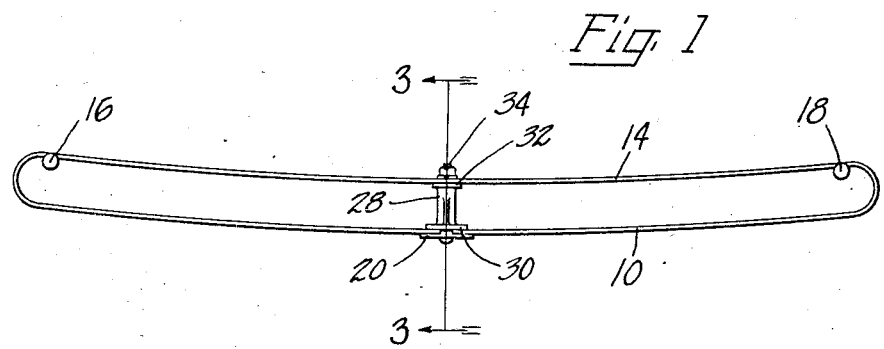
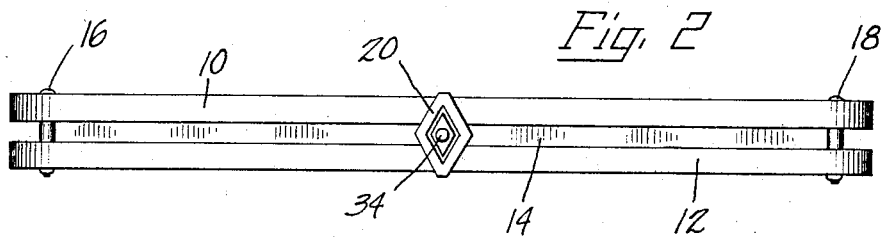
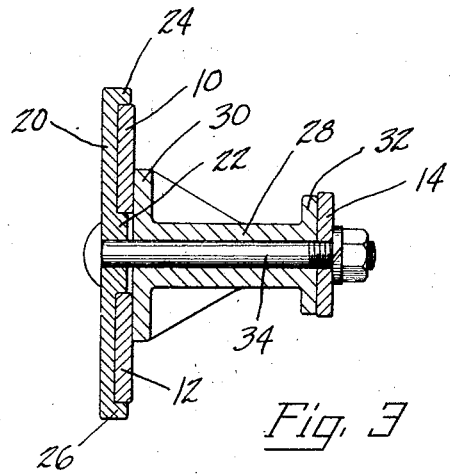
INVENTOR
William H. Moyse
BY
ATTORNEYS INVENTOR
William H. Moyse
BY
ATTORNEYS Patented Oct. 5, 1926.

1,601,807

UNITED STATES PATENT OFFICE.

WILLIAM H. MOYSE, OF OSHAWA, ONTARIO, CANADA, ASSIGNOR TO GENERAL MOTORS CORPORATION, OF DETROIT, MICHIGAN, A CORPORATION OF DELAWARE.

VEHICLE BUMPER.

Application filed February 27, 1925. Serial No. 12,022.

This invention relates to vehicle bumpers, and is illustrated as embodied in double bar bumpers for automobiles.

One object of the invention is to provide a strong bumper in the form of an especially deep truss, by clamping together the impact bars and a rear supporting device including one or two rear bars, by means of a bolt passing through a front plate and through a spacer of substantial length, the spacer being interposed between the rear faces of the impact bars and the front face of the rear bar device.

Another object of the invention is to provide an especially strong bumper having rounded ends, by looping both impact bars rearwardly at both ends, and connecting the looped ends by a rear supporting device of one or two bars clamped firmly to the centers of the impact bars to form a pair of strong spring trusses.

Figure 4:
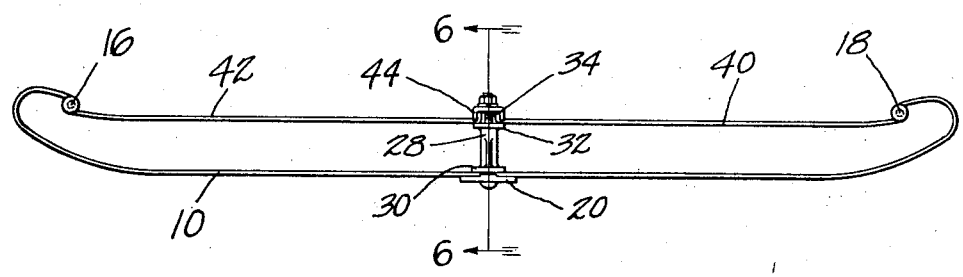
Figure 5:
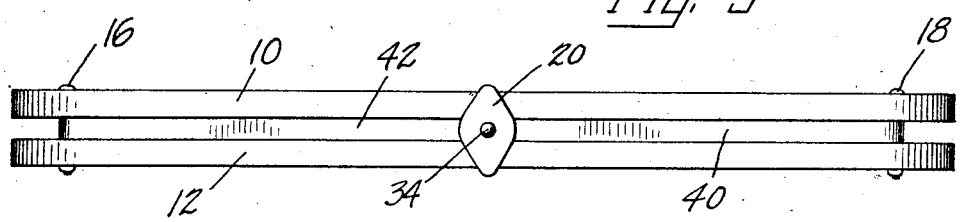
Figure 6:
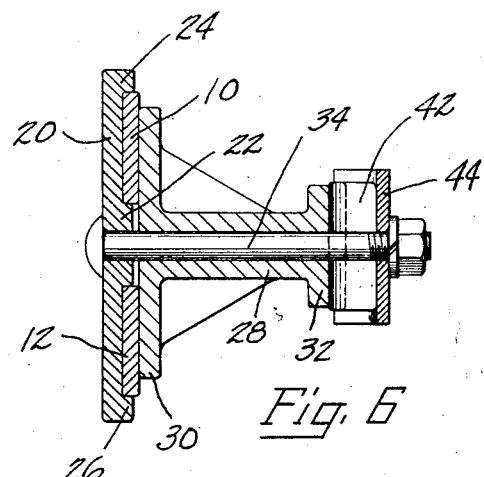

The above and other objects and features of the invention, including various novel and desirable details of construction, will be apparent from the following description of two illustrative embodiments shown in the accompanying drawings, in which:

Figure 1 is a top plan view of one illustrative bumper;
Figure 2 is a front elevation of the same bumper;

Figure 3 is a vertical section on the line 3—3 of Figure 1, showing the clamp; and Figures 4, 5, and 6 are figures corresponding respectively to Figures 1 2, and 3, but showing a bumper of modified form.

In the arrangement of Figures 1, 2, and 3, vertically spaced parallel impact bars 10 and 12, extending entirely across the front or rear of an automobile, are bent or looped rearwardly at opposite ends, to form rounded ends for the bumper which are pleasing in appearance and which will not catch on adjacent cars. The rear bar device in this form is a single straight bar 14, formed with eyes at its opposite ends which are interposed between eyes formed on the ends of bars 10 and 12, the three bars being connected by vertical bolts 16 and 18 passing through the alined eyes. At the center, the bars are connected to form a deep truss by a clamp including a front plate 20 having a spacer lug 22 extending between the bars 10 and 12 and having upper and lower fingers 24 and 26 hooking respectively over the upper bar and below the lower bar. Between the two front bars and bar 14 is a spacer 28 of substantial length, having a head 30 resting against the rear of the front bars and a head 32 resting against the front of bar 14. The whole is clamped together by a bolt 34 passing through plate 20 and spacer 28 and through a hole in bar 14. The bumper may be attached to the chassis frame by suitable brackets of any desired form (not shown) mounted on bar 14 at opposite sides.

The bumper shown in Figures 4, 5, and 6 differs from that described above in that the rear supporting device comprises alined bars 40 and 42, bolted as described to the impact bars 10 and 12, and bent over at their adjacent ends to hook over the flanges of a channel-shaped rear clamp plate 44 through which the bolt 34 passes. The ends of bars 40 and 42 abut against bolt 34 on opposite sides.

While two illustrative embodiments have been described, it is not my intention to limit the scope of the invention to those particular embodiments, or otherwise than by the terms of the appended claims.

I claim:

1. A bumper comprising, in combination, a pair of vertically spaced parallel impact bars, a bar device connected at its opposite ends to the impact bars and spaced rearwardly therefrom and a central reinforcing clamp including a plate engaging the front of the impact bars at their centers, a spacer of substantial length comprising a cylindrical member having at each end lateral integral extensions for engaging the front of said bar device and the rear of the impact bars respectively, and a bolt passing through the plate and the spacer and clamping the bar device and the spacer and the impact bars all together.

2. A bumper comprising in combination, a pair of vertically spaced parallel impact bars, each of which is looped rearwardly at both ends to provide rounded bumper ends, a divided bar device connected at its opposite ends to the rearwardly looped ends of the impact bar and having the interior adjoining ends formed with outwardly extending flanges; a channel-shaped clamp plate to engage the flanges, a front clamping plate, a cylindrical spacer having at one end webbed lateral extensions to bear against the rear of the impact bars, and at the other end a flange for engagement with the adjacent ends of the said bar device; and a bolt passing through the first named plate, the spacer and the last named plate to clamp together all the said parts constituting the bumper.

3. The combination with a pair of vertically spaced rearwardly looped impact bars, of a rear bar comprising a pair of substantially straight bars connected to the said bars, the inner opposite ends of the bars being formed with outwardly extending flanges, a flanged plate to straddle the flanges whereby all the said bars are resiliently urged together; and a central reinforcing clamp including a plate engaging the front of the impact bars, a cylindrical spacer formed at one end with oppositely disposed ears for bearing against the impact bars, and at the other end with a flange for engagement with the said interior ends of the rear bar; and a bolt passing through the first named plate, the said spacer and last named plate, whereby the various parts of the bumper are locked together.

In testimony whereof I affix my signature.

WILLIAM H. MOYSE.